(12) United States Patent
Khan

(10) Patent No.: US 7,978,232 B1
(45) Date of Patent: Jul. 12, 2011

(54) PHOTOGRAPH LOCATION STAMP

(75) Inventor: Rafay Khan, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 959 days.

(21) Appl. No.: 10/772,810

(22) Filed: Feb. 5, 2004

(51) Int. Cl.
*H04N 5/76* (2006.01)
*H04N 7/00* (2011.01)
*H04N 7/18* (2006.01)

(52) U.S. Cl. ..................... 348/231.3; 348/116

(58) Field of Classification Search .. 348/207.99–207.2, 348/231.2, 231.3, 231.5
See application file for complete search history.

(56) References Cited

U.S. PATENT DOCUMENTS

| | | | | |
|---|---|---|---|---|
| 5,913,078 A * | 6/1999 | Kimura et al. | ............... | 396/50 |
| 6,023,241 A | 2/2000 | Clapper | ............... | 342/357.13 |
| 6,133,947 A | 10/2000 | Mikuni | ............... | 348/183 |
| 6,182,010 B1 | 1/2001 | Berstis | ............... | 701/211 |
| 6,459,388 B1 * | 10/2002 | Baron | ............... | 340/996 |
| 6,462,778 B1 * | 10/2002 | Abram et al. | ............... | 348/239 |
| 6,484,086 B2 | 11/2002 | Jeon | ............... | 701/93 |
| 6,522,889 B1 * | 2/2003 | Aarnio | ............... | 455/456.5 |
| 6,657,661 B1 * | 12/2003 | Cazier | ............... | 348/231.2 |
| 6,657,666 B1 * | 12/2003 | Imagawa et al. | ............... | 348/333.02 |
| 6,690,883 B2 * | 2/2004 | Pelletier | ............... | 396/321 |
| 6,766,245 B2 * | 7/2004 | Padmanabhan | ............... | 701/207 |
| 6,766,425 B2 * | 7/2004 | Deutscher et al. | ............... | 711/152 |
| 6,833,861 B2 * | 12/2004 | Matsumoto et al. | ............... | 348/207.2 |
| 6,914,626 B2 * | 7/2005 | Squibbs | ............... | 348/231.3 |
| 6,943,825 B2 | 9/2005 | Silvester | ............... | 348/113 |
| 7,007,243 B2 * | 2/2006 | Baldino | ............... | 715/853 |
| 7,084,903 B2 * | 8/2006 | Narayanaswami et al. | ............... | 348/207.99 |
| 2001/0051850 A1 | 12/2001 | Wietzke et al. | ............... | 701/207 |
| 2001/0056326 A1 | 12/2001 | Kimura | ............... | 701/208 |
| 2003/0078724 A1 | 4/2003 | Kamikawa et al. | ............... | 701/208 |
| 2003/0164796 A1 | 9/2003 | Needham | ............... | 342/357.13 |
| 2003/0184654 A1 | 10/2003 | Kinjo | ............... | 348/207.1 |
| 2003/0202104 A1 | 10/2003 | Werner | ............... | 348/207.99 |
| 2004/0021780 A1 * | 2/2004 | Kogan | ............... | 348/231.3 |
| 2004/0054463 A1 | 3/2004 | Bock | ............... | 701/207 |
| 2005/0225643 A1 * | 10/2005 | Grignani | ............... | 348/207.99 |
| 2005/0268254 A1 * | 12/2005 | Abramson et al. | ............... | 715/855 |

* cited by examiner

*Primary Examiner* — David Ometz
*Assistant Examiner* — Carramah J Quiett
(74) *Attorney, Agent, or Firm* — Adil M. Musabji; Frank J. Kozak; Jon D. Shutter

(57) ABSTRACT

A camera includes a feature that associates meaningful information with a photograph to indicate where the photograph was taken. The camera includes equipment that determines a physical position associated with an image. An application uses geographic data to determine a municipality, or other administrative or governmental area, in which the physical position is located and associates data indicating the municipality, or other administrative or governmental area, with the image.

10 Claims, 5 Drawing Sheets

PHOTOGRAPH LOCATION STAMP

BACKGROUND OF THE INVENTION

The present invention relates to a feature for a camera that adds an identification mark to a photograph to indicate the location where the photograph was taken.

Improvements in photography have enabled various kinds of information to be associated with pictures. For example, a time and/or date stamp can be associated with a photograph. The time or date stamp may appear on the actual print of the photograph image or may be associated with a data file of the photograph image. Other improvements allow users to add labels or text to photos. These labels or text may appear in the actual print of the photograph image or may be associated with the data file of the photograph image. Another improvement allows location data to be associated with photographs. The location data may indicate where a photograph was taken. The location where a photograph was taken may be determined using positioning equipment, such as a GPS unit. A GPS unit associated with a camera indicates an absolute global position, i.e., geographic coordinates, such as latitude and longitude. This type of information is very useful. However there exists room for improvements.

Accordingly, it is an objective to provide a way to indicate a location associated with a photograph that is meaningful to the user.

SUMMARY OF THE INVENTION

To address these and other objectives, the present invention includes a feature for a camera that associates meaningful information with a photograph to indicate where the photograph was taken. The camera includes equipment that determines a physical position associated with an image. An application uses geographic data to determine a municipality, or other administrative or governmental area, in which the physical position is located and associates data indicating the municipality, or other administrative or governmental area, with the image.

DETAILED DESCRIPTION OF THE PRESENTLY PREFERRED EMBODIMENTS

Figure 1:
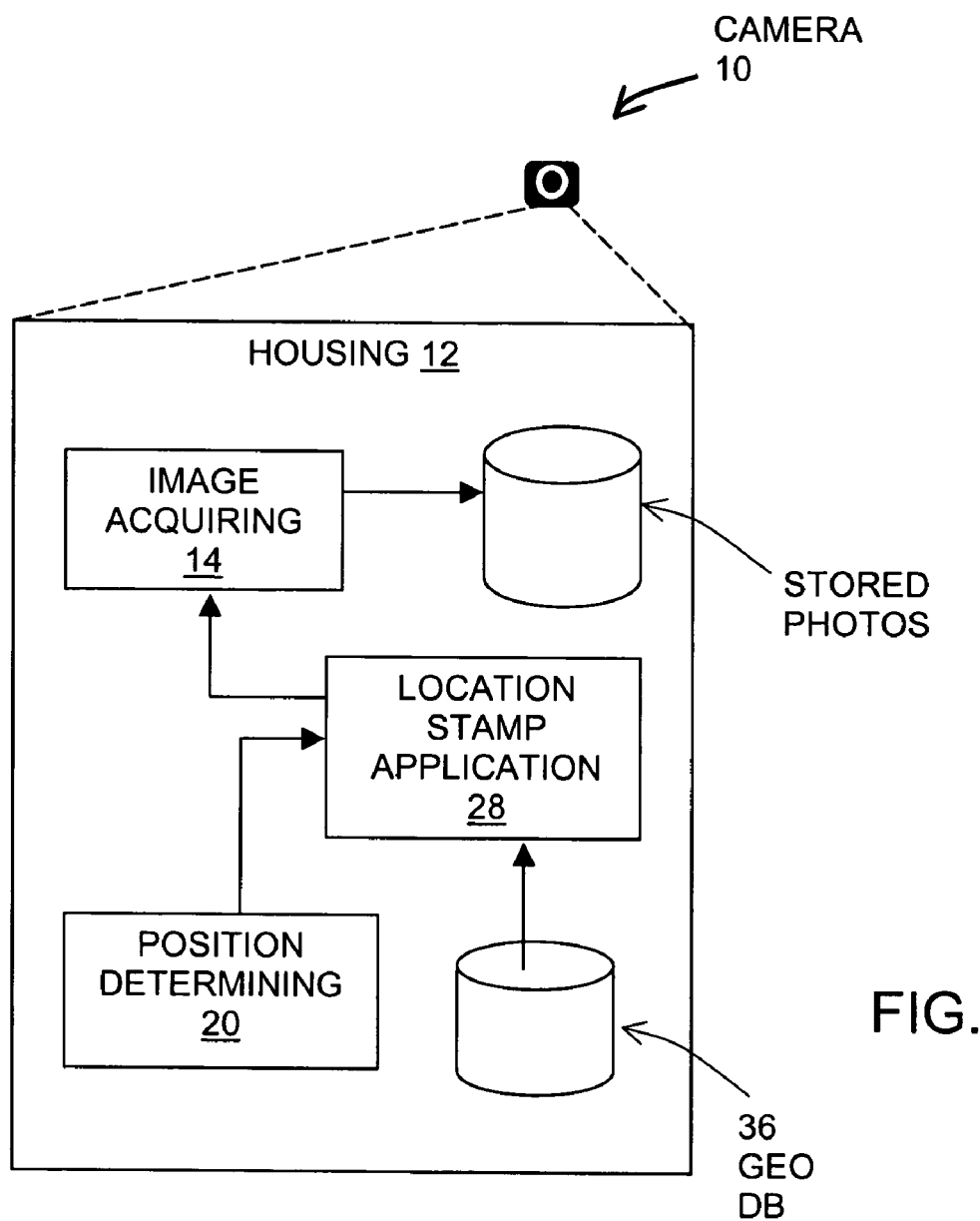
FIG. 1 is a block diagram showing a camera according to a first embodiment.

FIG. 1 is a block diagram showing components of a camera 10 that incorporates a first disclosed embodiment. The camera 10 includes a housing 12. Located in the housing 12 is an image acquiring means 14. The image acquiring means 14 incorporates any current or future technology for acquiring and saving visual images (or data versions thereof) of observable views on a media. The image acquiring means 14 may acquire and save the visual images in analog or digital form. If digital form is used, any suitable format, such as *.jpg, *.bmp, or *.png, may be used. Other formats may also be used. The media on which the visual images (or data versions thereof) are stored may include flash cards, film, disks, and so forth.

The camera 10 includes a component 20 that determines the position of the camera 10. In one embodiment, the position determining component 20 is a GPS unit. Alternatively, the position determining component 20 is implemented using other technology. Such alternatives include DGPS, LORAN, inertial sensors, cell phone positioning equipment (whereby the location of a cell phone can be determined remotely using signal triangulation, signal time-of-arrival, etc.) and so on. Combinations of different technologies may also be used. The position determining component 20 may use (or rely on) equipment or components located outside the camera housing 12. For example, in the case of a GPS unit, the position determining component 20 relies on signals from GPS satellites.

In this embodiment, the camera 10 includes a location stamp program or application 28. The location stamp program 28 associates data that indicate an administrative (or governmental) area or place with images (or data versions thereof) acquired by the camera. The camera 10 includes suitable hardware and software to execute the location stamp program 28. For example, the camera 10 includes a suitable processor, memory, data storage, operating system, user interface and power supply.

The location stamp program 28 uses a geographic database 36. The geographic database 36 is stored on a suitable media, such as a ROM, flash memory card, etc. In one embodiment, the geographic database 36 is located with the camera 10, i.e., located in the camera housing 12. The geographic database 36 includes information about administrative (or governmental) areas or places, such as municipalities, including cities, towns, villages, etc. In one embodiment, the geographic database 36 includes information about the positions of the administrative (or governmental) areas or places. The information in the geographic database 36 may include the geographic locations (e.g., coordinates) of the administrative (or governmental) areas or places or boundaries thereof. The geographic database may also include information about other hierarchical layers of administrative (or governmental) areas or places, such as states, provinces, counties, countries, etc.

Figure 2:
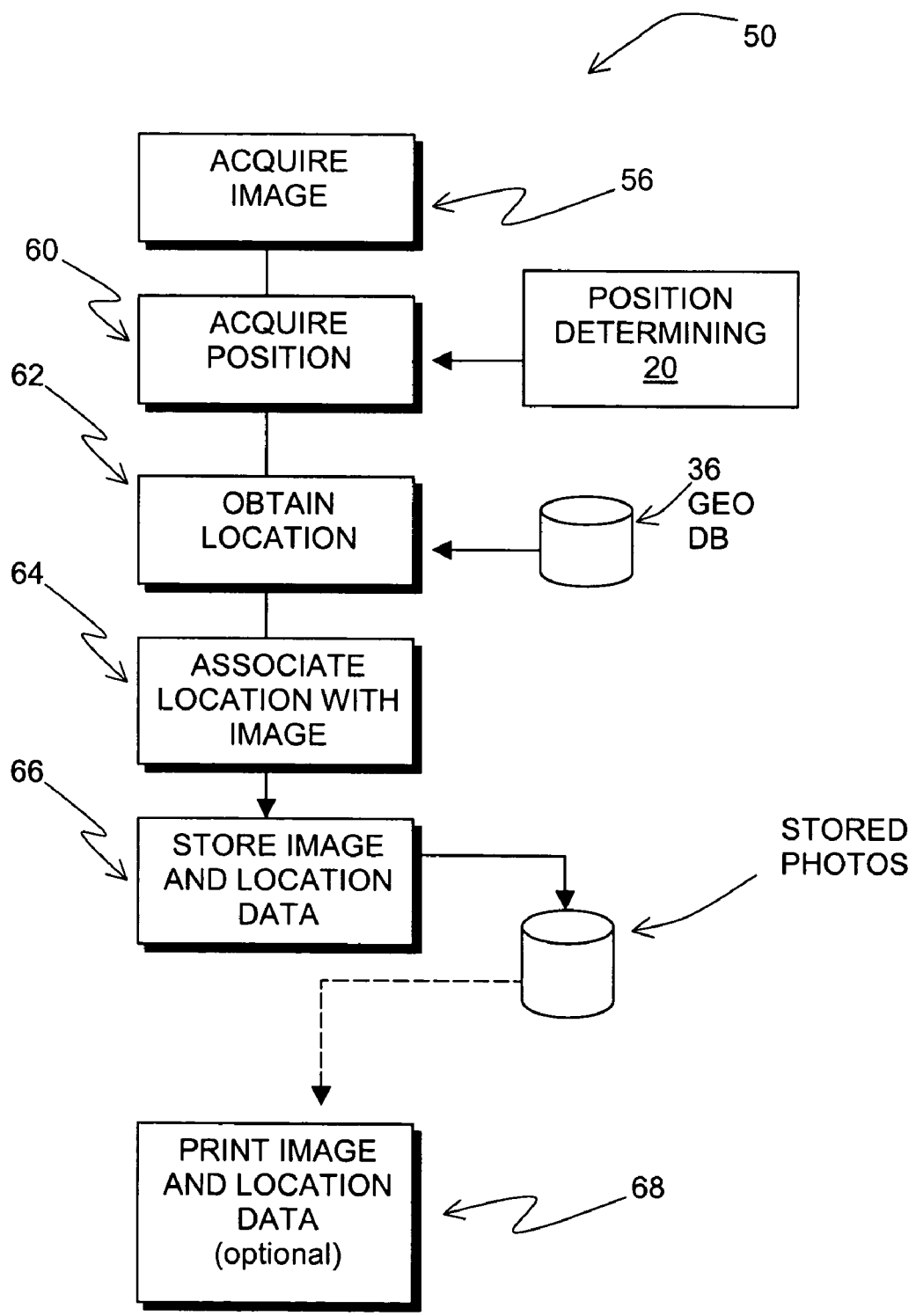
FIG. 2 is a flow chart showing a process performed by the embodiment of FIG. 1.

As stated above, the location stamp program 28 associates data that indicate an administrative (or governmental) area or place with images (or data versions thereof) acquired by the camera. FIG. 2 illustrates a process 50 performed by the camera 10.

The camera is operated to take a picture (Step 56 in FIG. 2). When the camera is operated to take a picture, the location stamp program 28 is executed. The location stamp program 28 receives data from the position determining component 20 that indicates the position of the camera when the picture is being taken (Step 60). The location stamp program 28 accesses the geographic database 36 and determines which municipality the camera is located in (Step 62). The location stamp program 28 associates information indicating the municipality with the picture (Step 64). In one embodiment, the location stamp program 28 adds text indicating the municipality to the picture image. The location stamp program 28 stores the photographic image with the data indicating the location (Step 66). Optionally, the photographic image with the data indicating the location is printed (Step 68).

Figure 3:
FIG. 3 is an illustration of a photograph produced with the embodiment of FIG. 1, showing a location stamp on the photograph.

FIG. 3 shows an example of a picture produced by the embodiment of FIGS. 1 and 2. In FIG. 3, a picture 70 of Chicago, Ill., has text 72 indicating "CHICAGO, Ill." overlaid on the image.

Figure 4:
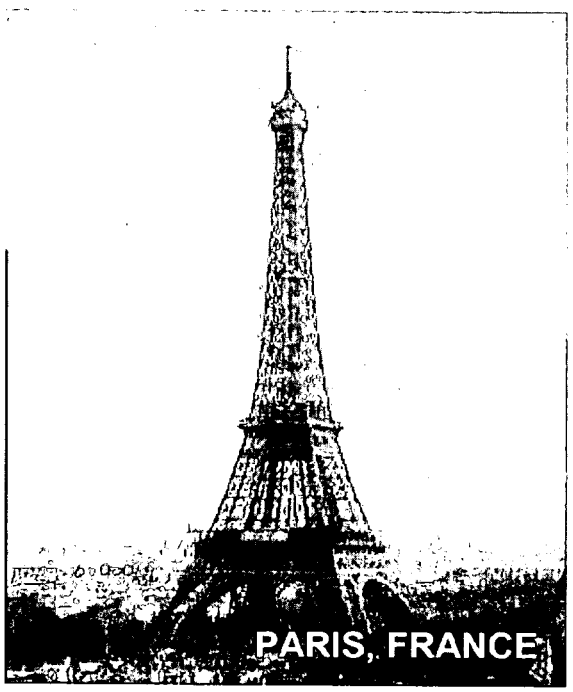
FIG. 4 is an illustration of another photograph produced with the embodiment of FIG. 1.

FIG. 4 shows another example of a picture produced by the embodiment of FIGS. 1 and 2. In FIG. 4, a picture 80 of Paris, France, has text 82 indicating "PARIS, FRANCE" overlaid on the image.

An advantage of the present embodiment is that meaningful information is added to pictures taken by cameras. The information is indicates the place (e.g., where a picture was taken). This kind of information may be more meaningful than geographic coordinates.

Alternative Embodiments with Remote Geographic Databases

Figure 5:
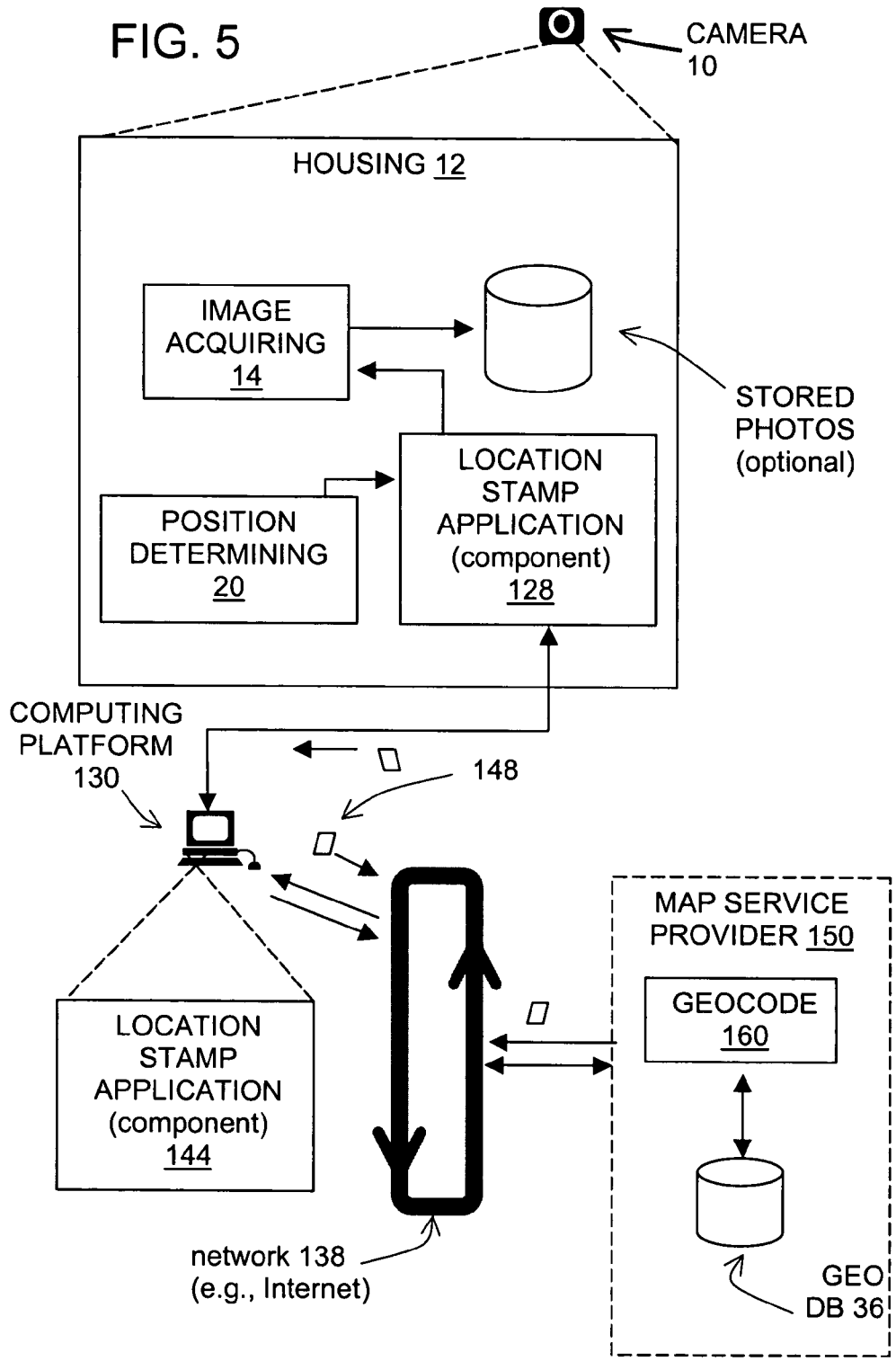
FIG. 5 is a block diagram showing an alternative embodiment.
Figure 6:
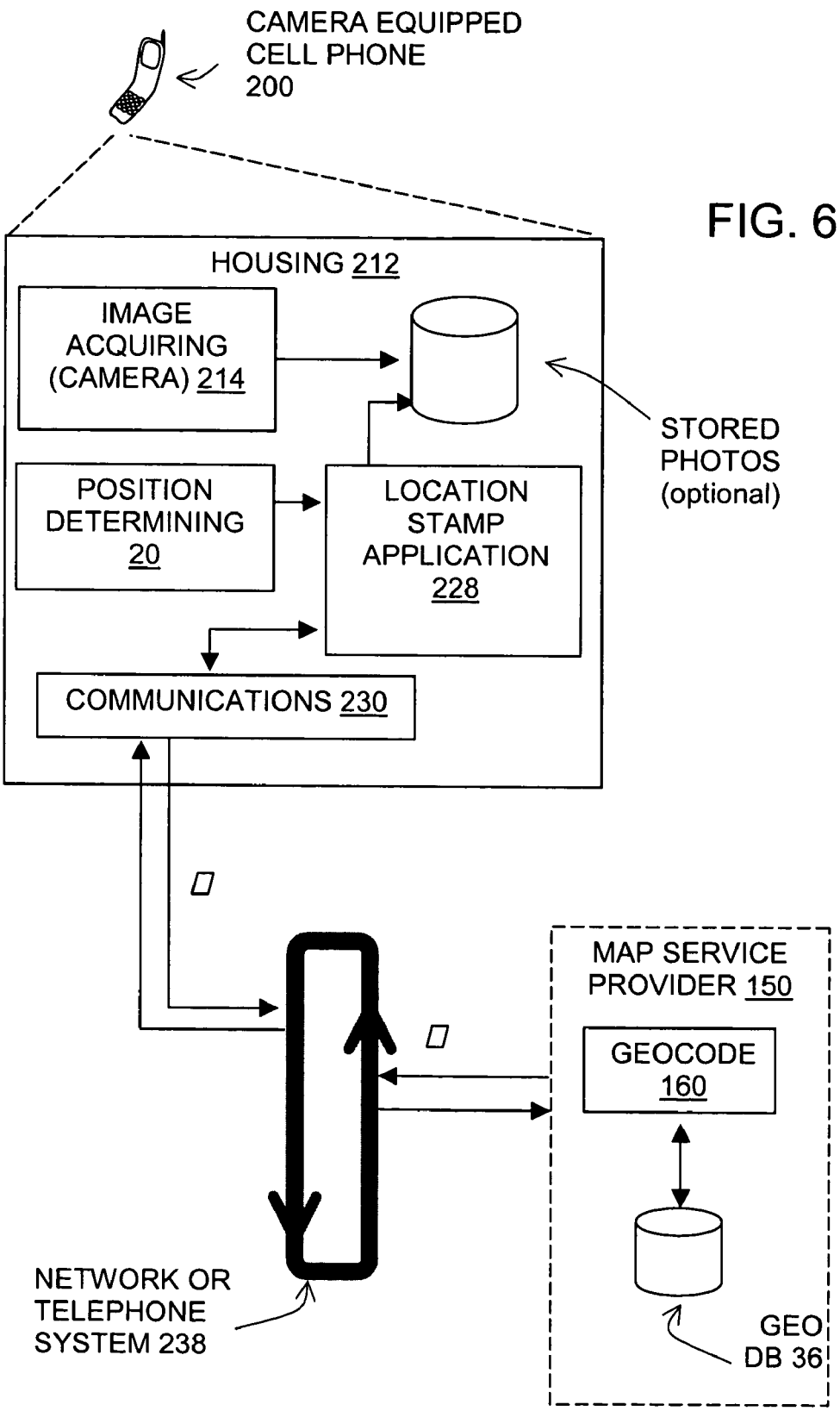
FIG. 6 is a block diagram showing another alternative embodiment.

In alternative embodiments, the geographic database used to determine the location stamp to associate with a photograph may be located remotely from the camera. FIGS. 5 and 6 show alternative embodiments that use geographic databases located remotely from cameras that provide location stamp features. (In FIGS. 5 and 6 components labeled with the same numbers as in previous figures are similar or identical to those previously described components.)

FIG. 5 shows a camera 10, which is similar to the camera described in the previous embodiments. In the embodiment of FIG. 5, the camera 10 does not have a geographic database located with the camera. With the embodiment of FIG. 5, a user operates the camera 10 to take pictures, as described in the previous embodiment. When the camera 10 is operated to take a picture, a position determining component 20 determines a position of the camera 10. The position determining component 20 may be a GPS unit and the position determined by the GPS unit may indicate the position of the camera in geographic coordinates. A location stamp application 128 associates data indicating the position determined by the position determining component 20 with a data file of the picture. At this stage, the location stamp application 128 does not actually add the data indicating the position (i.e., which expresses the position as geographic coordinates) to the picture image, but maintains information that indicates the relationship between the position and the picture image.

At a later time, the user connects the camera 10 to a computing platform 130. (Any suitable connection means may be used, such as a USB connection or a wireless connection.) The computing platform 130 may be a general purpose computing device, such as a personal computer or a PDA. The computing platform 130 is connected to a data network 138, such as the Internet. When the camera 10 is connected to the computing device 130, a corresponding location stamp application 144 is run. The corresponding location stamp application 144 communicates with the camera 10 and obtains the data indicating the positions associated with each of the pictures taken by the camera. Then, the corresponding location stamp application 144 transmits a message 148 from the computing platform 130 over the network 138 to a map service server 150. The message 148 includes the data indicating the positions of all the pictures taken by the camera. The message 148 requests the map service server 150 to indicate the municipalities (or other administrative or governmental areas) associated with each of the positions.

The map service server 150 includes the hardware and software necessary to send and receive requests automatically over the data network 138. The map service server 150 also includes a geocoding application 160. The geocoding application 160 uses a geographic database 36 to determine the municipalities (or other administrative or governmental areas) associated with each of the positions. After determining the municipalities (or other administrative or governmental areas) associated with each of the positions, the map service server 150 sends a message including this information back to the computing platform 130.

On the computing platform 130, the corresponding location stamp application 144 communicates the information received from the map service server 150 back to the camera 10. On the camera 10, the location stamp application 128 associates the respective text data indicating each municipality (or other administrative or governmental area) with each of the corresponding images.

In an alternative version of this embodiment, the pictures with the position data (in geographic coordinates) are transferred from the camera to the computing platform. Then, when the data indicating the municipalities is transferred back to the computing platform, the municipality data is associated with the images on the computing platform, instead of on the camera.

FIG. 6 shows another embodiment in which the geographic database used to determine the municipalities associated with photographs is located remotely from the camera. In FIG. 6, a wireless phone 200 includes a camera 214 as a feature. The camera 214 in the wireless phone 200 may be similar to the cameras 10 described in the previous embodiments. With the embodiment of FIG. 6, a user operates the camera feature of the phone 200 to take a picture. When the camera in the phone 200 is operated to take a picture, a position determining component 20 in the phone 200 determines a position of the phone 200. As in the previous embodiments, the position determining component 20 may be a GPS unit and the position determined by the GPS unit may indicate the position in geographic coordinates. A location stamp application 228 in the phone 200 uses the communications features 230 of the phone 200 to communicate with a map service server 150. Communications between the phone 200 and the map services server 150 may use any suitable communications network 238. The location stamp application 228 in the phone requests the map service server 150 to indicate the municipality (or other administrative or governmental areas) associated with the position determined by the positioning determining component 20.

The map service server 150 uses a geocoding application 160 to determine the municipality (or other administrative or governmental area) associated with the position and provides this information back to the phone 200 where the information is associated (as text) with the image.

Additional Alternatives and Features

In one alternative embodiment, if the camera has an image preview feature, the location stamp may be shown on the preview image.

In another alternative embodiment, a camera having the location stamp feature provides the option to turn the location stamp on and off, as desired. The camera provides an appropriate selection option in the user interface of the camera for this purpose.

According to another alternative, the camera allows the user to determine where on a photographic image the location stamp appears. For example, the location stamp may appear by default in the lower right corner, but the user may be provided the option to have the location stamp in any other location in the image.

In one embodiment, the location stamp text is added (by the location stamp program) to the image of the picture and then the image with the added text is stored as an image. (In other words, the added location stamp text becomes part of the stored data image.) In an alternative embodiment, the location stamp text is not added as text in the image of the picture, but instead is associated with the data of the image. This association may be made by the location stamp program using known data linking or storage techniques. This latter embodiment allows the photographic image to be shown (i.e., displayed, printed) at a later time with the location stamp removed, if desired.

According to another embodiment, if the camera is located outside a municipality, the location stamp may indicate the state, province or country instead.

The location stamp is not limited to identifying the municipality in which a picture is taken. The location stamp may be used to identify other areas, such as well known places like the Grand Canyon, the Pyramids, etc.

In another alternative embodiment, the location stamp feature may include major landmarks located in or near municipalities. For these municipalities, a user of a camera with the location stamp feature will have the option to choose a location stamp for a photograph that identifies a specific landmark instead of (or in addition to) a location stamp that identifies the municipality. For example, a user of camera with the location stamp feature who takes a photograph near the Washington Monument in Washington D.C. will be provided the option to have text added to the photograph that indicates "WASHINGTON D.C." or "WASHINGTON MONUMENT" or both. To support this function, the geographic database used by a camera includes data that indicates the locations of certain landmarks within or near municipalities. When the position (i.e., coordinates) associated with a photograph is within an observable view of a landmark, the user is provided the option to have text indicating either the landmark, or the municipality, or both, associated with the photograph. (In the case where more than one landmark may be observable from a given location, the user may be requested to choose the text for one landmark from all the possible landmarks to associate with a photograph.)

The geographic database used by the camera may be updatable or non-updatable. If the geographic database is updatable, it may be updated by replacing the entire geographic database including the media on which it is stored with a new geographic database. Alternatively, if the geographic database is stored on a re-writable media, the old geographic database may be overwritten with a newer version.

The location stamp feature may be used in cameras that take pictures on film as well as cameras that take pictures digitally.

The location stamp feature may be used in cameras incorporated in other electronic devices, such as phones, video camcorders, or PDAs.

It is intended that the foregoing detailed description be regarded as illustrative rather than limiting and that it is understood that the following claims including all equivalents are intended to define the scope of the invention.

I claim:

1. A non-transitory computer-readable recording medium encoded with a computer program that performs a method of using a remotely located map service server, the method comprising:
    obtaining data from a camera removably connected to a computer platform, the obtained data indicating geographic coordinates associated with each of a plurality of pictures taken by the camera;
    transmitting the geographic coordinates associated with each of the plurality of pictures to the remotely located map service server to request a municipality name corresponding to the geographic coordinates associated with each of the plurality of pictures, the remotely located map service server including data that indicates whether a landmark is observable by a person from specific geographic coordinates; and
    if the transmitted geographic coordinates associated with at least one of the plurality of pictures are determined to be coordinates from which the landmark is observable via a person's view based on the data included in the remotely located map service server, receiving, from the remotely located map service server, data indicating a name of the landmark.

2. The method of claim 1 wherein the camera is removably connected to the computer platform with a USB cable.

3. The method of claim 1 wherein the camera is removably connected to the computer platform with a wireless connection.

4. The method of claim 1, further comprising:
    adding the name of the landmark to the at least one of the plurality of pictures.

5. The method of claim 1, further comprising:
    adding the name of the landmark and the municipality name to the at least one of the plurality of pictures.

6. A method of using a remotely located map service server computer readable, the method comprising:
    obtaining data from a camera removably connected to a computer platform, the obtained data indicating geographic coordinates associated with each of a plurality of pictures taken by the camera;
    transmitting geographic coordinates associated with each of the plurality of pictures to the remotely located map service server to request a municipality name corresponding to the geographic coordinates associated with each of the plurality of pictures, the remotely located map service server including data that indicates whether a landmark is observable by a person from said geographic coordinates; and
    if the transmitted geographic coordinates associated with at least one of the plurality of pictures are determined to be coordinates from which the landmark is observable via a person's view based on the data included in the remotely located map service server, receiving, from the remotely located map service serve, data indicating a name of the landmark.

7. The method of claim 6, further comprising:
    adding the name of the landmark to the picture.

8. The method of claim 6, further comprising:
    adding the name of the landmark and the municipality name to the picture.

9. The method of claim 6 wherein the camera is removably connected to the computer platform with a USB cable.

10. The method of claim 6 wherein the camera is removably connected to the computer platform with a wireless connection.

* * * * *